United States Patent
Martin

[19]

[11] Patent Number: 6,065,463
[45] Date of Patent: May 23, 2000

[54] FORCED CONVECTIVE TRACK OVEN

[75] Inventor: Alan Martin, Stalybridge, United Kingdom

[73] Assignee: Sasib Bakery North America, Inc., Plano, Tex.

[21] Appl. No.: 09/174,646

[22] Filed: Oct. 19, 1998

[51] Int. Cl.[7] .............................. A21B 1/00; F24C 15/32
[52] U.S. Cl. ..................... 126/21 A; 99/386; 99/443 C; 99/479; 219/388; 34/216; 432/199; 198/778
[58] Field of Search ................................ 126/21 A, 21 R; 99/443 C, 443 R, 447, 479, 478, 477, 386; 219/388; 34/216, 203, 207, 208; 432/128, 133, 176, 199, 222; 198/778, 831, 952

[56] References Cited

U.S. PATENT DOCUMENTS

| | | | |
|---|---|---|---|
| Re. 35,259 | 6/1996 | Williams | 99/443 C |
| 3,589,307 | 6/1971 | Lanham | 432/130 |
| 4,377,109 | 3/1983 | Brown et al. | 126/21 A |
| 4,544,352 | 10/1985 | Lanham et al. | 432/133 |
| 4,608,961 | 9/1986 | Lanham, Jr. et al. | 126/21 A |
| 4,631,029 | 12/1986 | Lanham et al. | 126/21 A |
| 4,726,766 | 2/1988 | Stewart et al. | 432/72 |
| 5,322,007 | 6/1994 | Caridis et al. | 99/443 C |
| 5,329,916 | 7/1994 | Lygum | 126/21 A |
| 5,702,245 | 12/1997 | London | 126/21 A |
| 5,741,536 | 4/1998 | Mauer et al. | 99/443 C |
| 5,756,133 | 5/1998 | Duggan et al. | 99/443 C |
| 5,850,781 | 12/1998 | Kuenen | 99/443 C |

FOREIGN PATENT DOCUMENTS 2.242.605  10/1991  United Kingdom .

*Primary Examiner*—Carl D. Price
*Assistant Examiner*—Josiah C. Cocks
*Attorney, Agent, or Firm*—Michael A. O'Neil

[57] ABSTRACT

A forced convective track oven comprises a track conveyor including first and second cylindrical spirals, the first cylindrical spiral for conveying bakery trays and dough products upwardly and the second spiral spiral portion for conveying bakery trays and dough products downwardly, thereby minimizing the number of changes of direction of the bakery trays as they travel along the track conveyor. A plurality of burners discharge heated air through discharge tubes and discharge nozzles into engagement with bakery trays carried by the track conveyor.

1 Claim, 5 Drawing Sheets

FORCED CONVECTIVE TRACK OVEN

TECHNICAL FIELD

This invention relates generally to track ovens of the type utilized in automated bakeries and similar applications, and more particularly to a forced convective heating system for track ovens and to a unique track oven configuration.

BACKGROUND AND SUMMARY OF THE INVENTION

Modern automated bakeries typically employ track ovens for the baking of bread, buns, rolls, and other bakery products. In a track oven, a track extends through a bakery enclosure, and a drive chain extends through the track and supports spaced apart conveyor grids. The grids receive and transport bakery pans and trays.

In the operation of a track oven, dough products are received on the trays which are then loaded onto the grids of the track oven. The grids and the dough-laden trays carried thereby are transported through the oven enclosure which is heated by ribbon burners. Air circulation apparatus may be utilized within the oven enclosure to provide a more even temperature distribution therein. The length of the track conveyor and the speed of operation thereof are regulated so that baking of the dough products is completed during transportation thereof through the oven.

Track ovens typically comprise spiral configurations having elongated side portions to accommodate the ribbon burners. U.S. Pat. No. 4,726,766, granted to Stewart et al. on Feb. 23, 1988, discloses a track oven having an inner ascending spiral and an outer descending spiral which allows both the conveyor inlet and the conveyor outlet to be at the level of the lowest conveyer tier. The '766 Patent also discloses an air circulation system that receives heated air from the upper region of the oven enclosure and discharges the heated air onto portions of the track conveyor that are physically separated from the ribbon burners.

The primary heating mechanism of track ovens utilizing ribbonn burners is radiant heating from the burner flame. Radiant heating is notoriously inefficient as compared with the much more efficient heat transfer that can be achieved utilizing forced convection heating. However, it has not heretofore been possible to provide forced convection heating in track ovens due to the very large size of the conveyors and the surrounding oven enclosures which are required in order to provide the through-put rates required of modern bakeries.

The present invention comprises a forced convection track open oven which overcomes the foregoing and other problems that have long since characterized the prior art. In accordance with one aspect of the invention, a track oven is provided with a plurality of burners, each associated with a particular zone within the oven. The burners produce heated air that is discharged through a plurality of discharge tubes and associated discharge nozzle. Fans are employed to circulate previously heated air through the burners, and the discharge tube/discharge nozzle structure functions to combine cooler used air with hot primary air for discharging to engagement with the bakery pans that are transported by the track conveyor.

In accordance with another aspect of the invention, the track conveyor comprises two circular spiral portions, one ascending and one descending. The use of circular spirals is advantageous is reducing the likelihood of pan jamming that has characterized prior track oven designs. Perhaps more importantly, the use of the circular spiral configuration in combination with discharge tubes and discharge nozzles to effect heating that allows the use of distinct zones within the oven, thereby affording better control over the baking process.

BRIEF DESCRIPTION OF THE DRAWINGS

A more complete understanding of the present invention may be had by reference to the following Detailed Description when taken in connection with the accompanying Drawings wherein.

DETAILED DESCRIPTION

Figure 1:
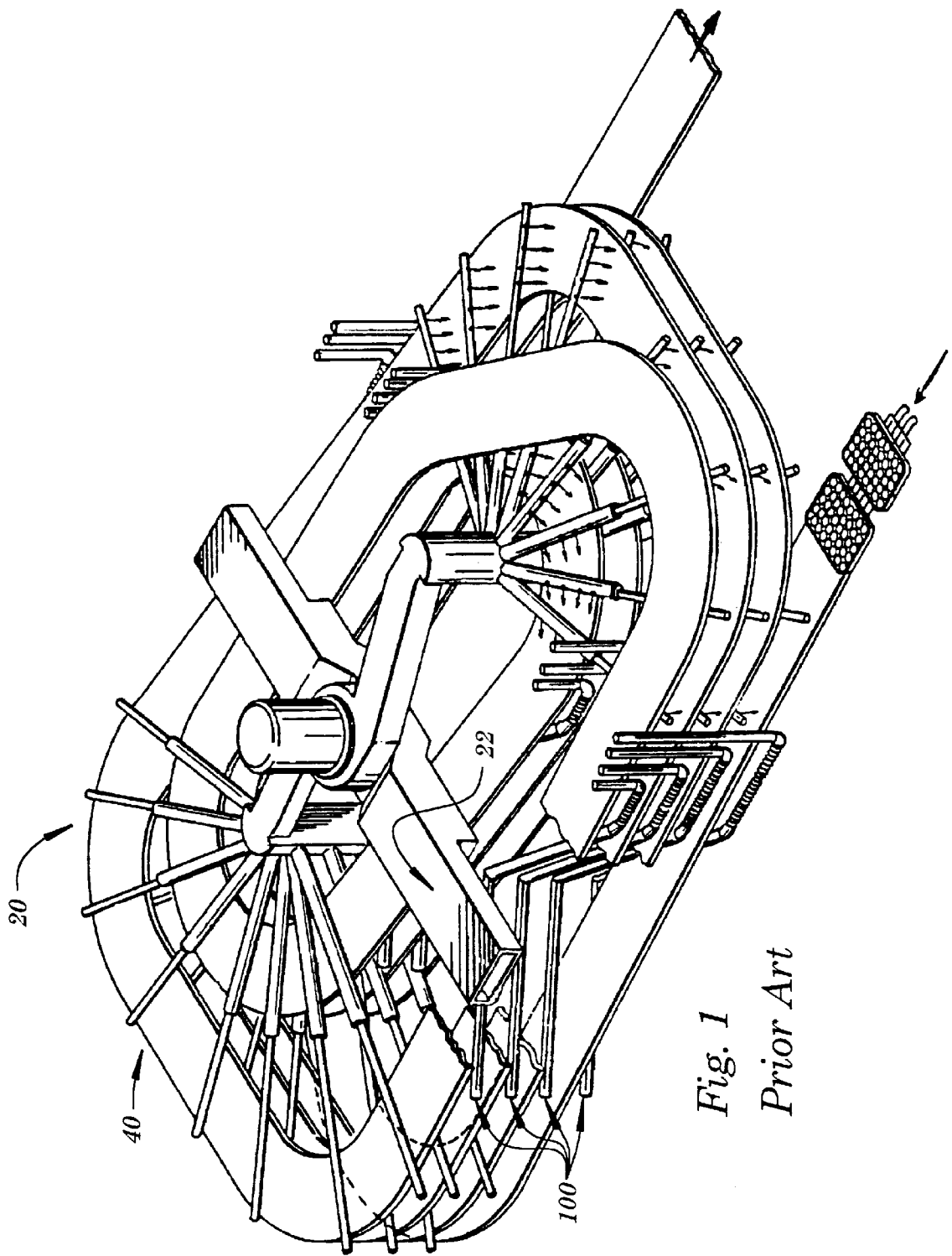
FIG. 1 is a prospective view of a prior art track oven.
Figure 2:
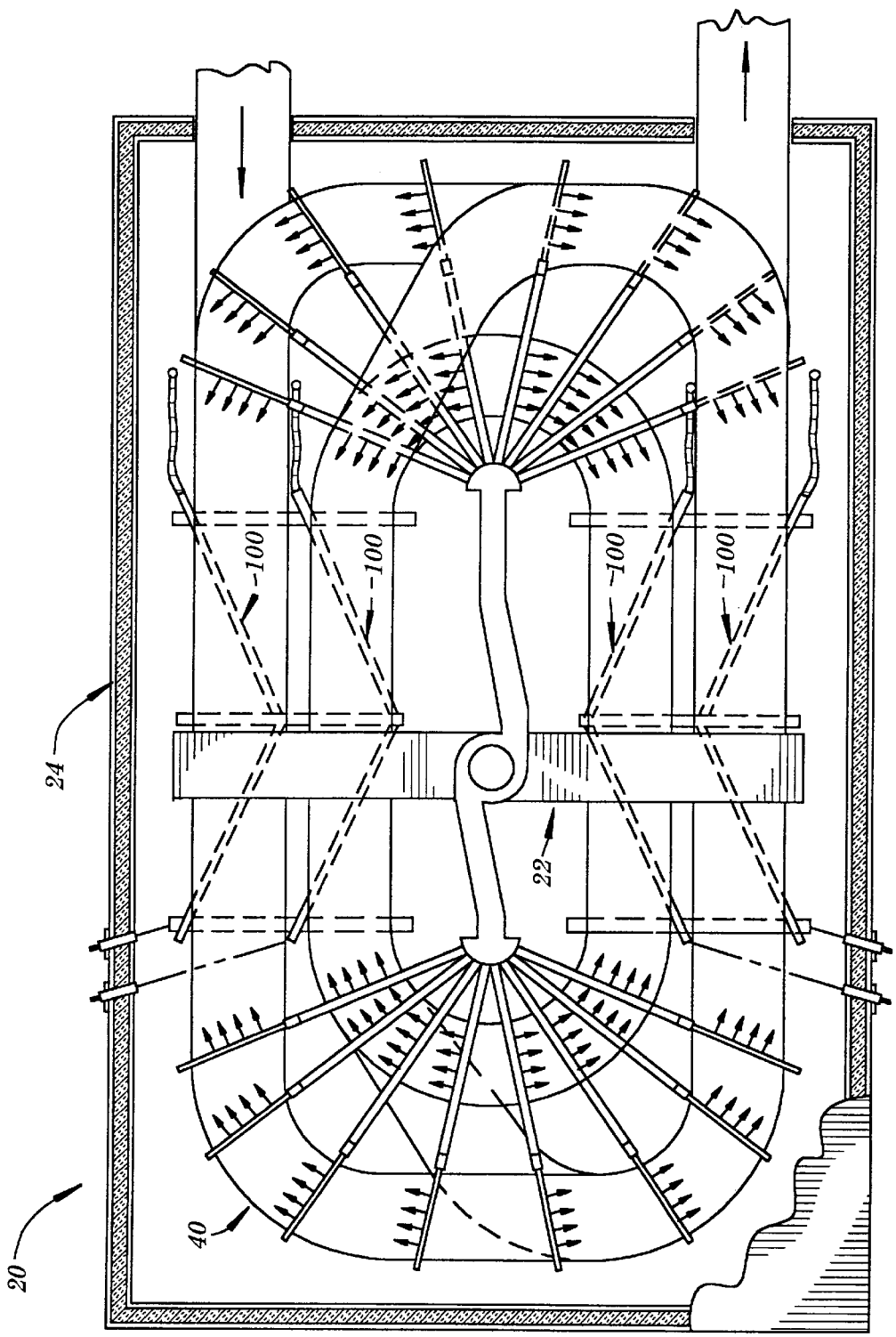
FIG. 2 is a top view of the track oven of FIG. 1.

Referring now to the Drawings, and particularly to FIGS. 1 and 2 thereof, there is shown a prior art track oven 20 of the type disclosed in U.S. Pat. No. 4,726,766, granted to Stewart {???Stuart???} et al. on Oct. 23, 1988. The oven 20 includes an enclosure 24 and a conveyor 40 situated within the enclosure 24. A plurality of ribbon burners 100 are utilized to heat and bake dough products which are transported through the interior of the enclosure 24 by the track conveyor 40. An air circulation and exhaust control system 22 is utilized to recover heated air from the upper regions of the enclosure 24 and to circulate the heated air to portion of the conveyor 40 which are physically separated from the ribbon burners 100.

Figure 3:
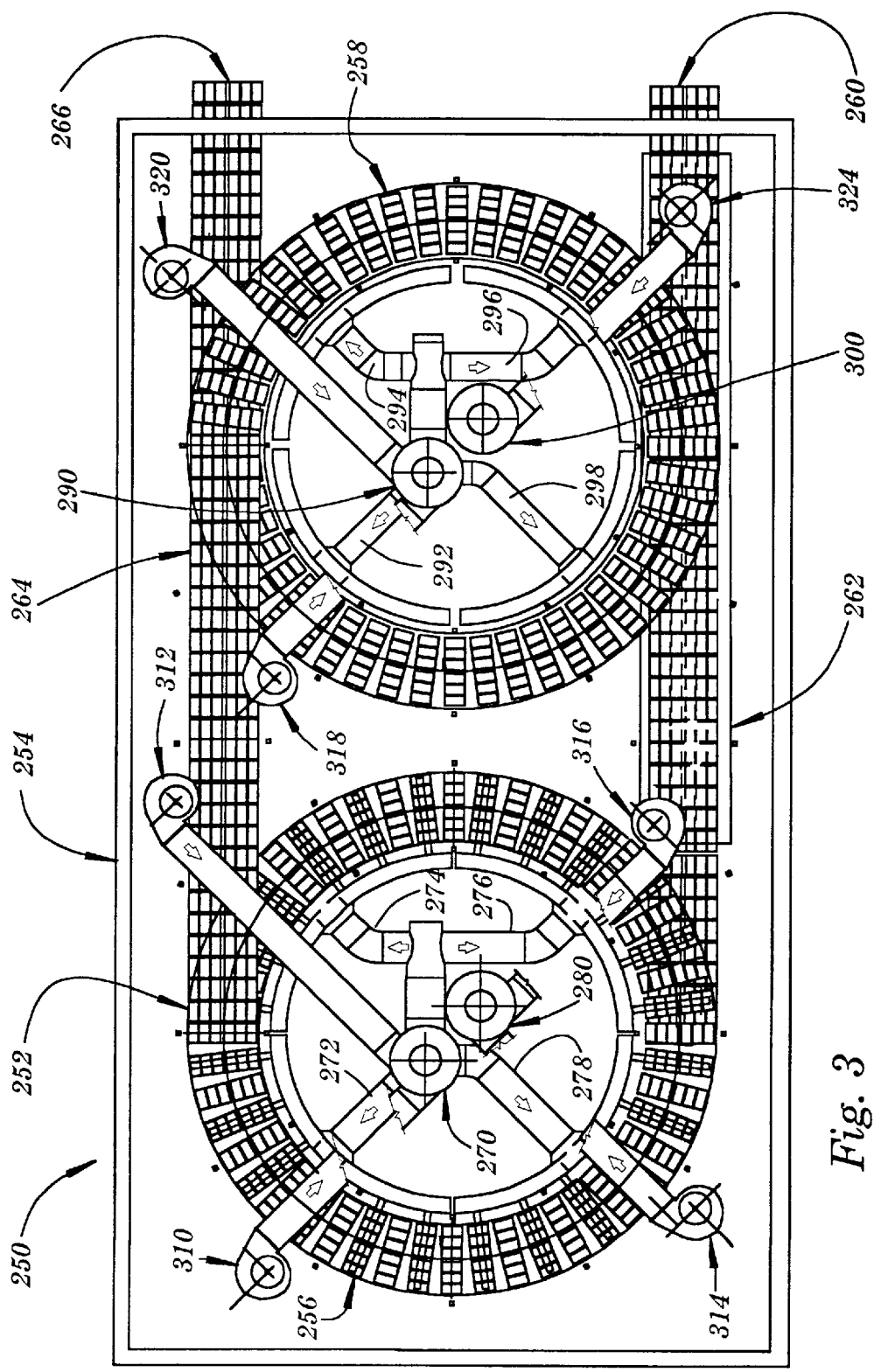
FIG. 3 is a top view of a forced convective track oven incorporating the present invention.
Figure 4:
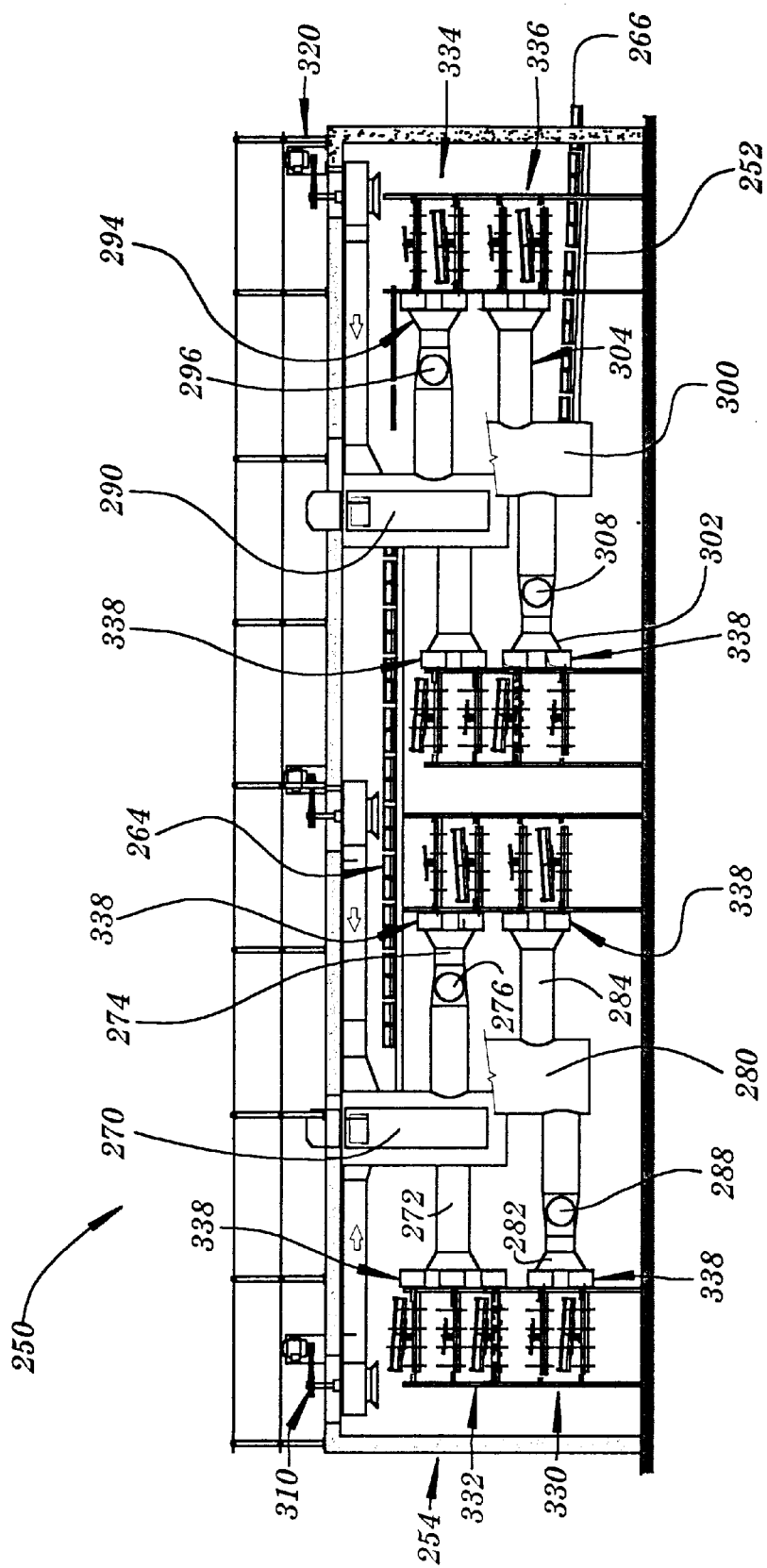
FIG. 4 is a longitudinal sectional view of the forced convective track oven of FIG. 3.
Figure 5:
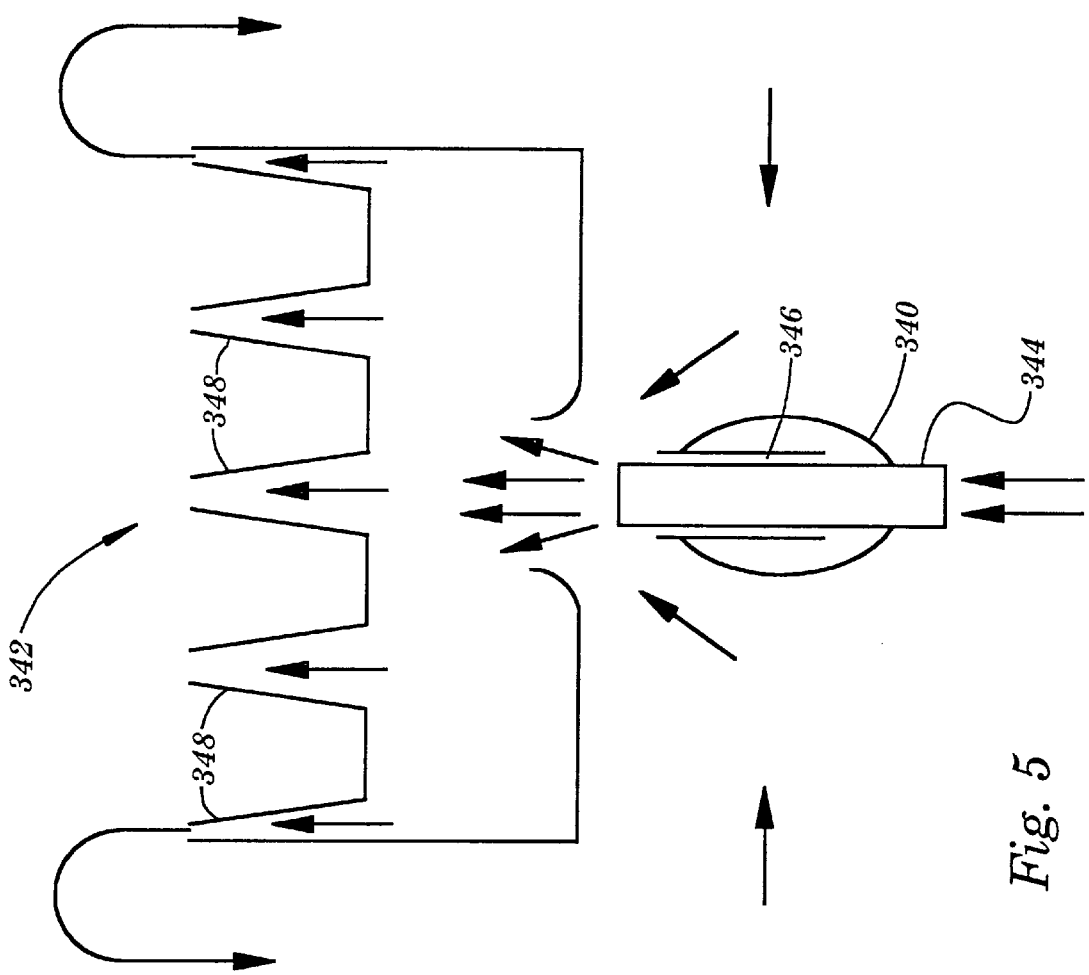
FIG. 5 is an illustration of the discharge tubes and discharge nozzles of the forced convective track oven discharge apparatus of the of FIGS. 3 and 4.

Referring to FIGS. 3, 4, and 5, there is shown a forced convective oven 250 incorporating the present invention. The oven 250 comprises a track conveyor 252 situated within an oven enclosure 254. The conveyor 254 differs from the conveyors utilized in prior art track ovens in that it comprises a first ascending circular spiral 256 and a second descending circular spiral 258.

In the operation of the forced convective track oven 250, dough products to be baked are carried by trays that are transported by the conveyor 252 into the oven enclosure 254 through an inlet 260. The inlet 260 is situated at the level of the lowest tier of the conveyor 252. The trays and the dough products carried thereby are transported from the inlet 260 to the first ascending circular spiral 256 by a longitudinally extending section 262 of the conveyor 252. The ascending circular spiral 256 of the conveyor 252 carries the trays and the dough products carried thereby upwardly through a series of tiers, and ultimately discharges the trays and the dough products carried thereby onto a transfer portion 264 of the conveyor 252. The transfer portion 264 transfers the trays and the dough products carried thereby from the ascending circular spiral 256 of the conveyor 252 to the descending circular spiral 258 thereof. The descending circular spiral 258 of the conveyor 252 transports the trays and the dough products carried thereby downwardly through a series of tiers, and ultimately discharges the trays and the now-baked dough products carried thereby through an outlet 266.

The use of a track conveyor having circular spirals is highly advantageous in the operation of the forced convective track oven 250. Prior art track ovens have utilized track conveyors having side portions which are elongated to accommodate ribbon burners. This in turn necessitates changes in the direction of movement of the trays carried by the conveyor at each end of the oval configuration thereof. Each such change of direction involves at least the possibility of pan jamming. This problem is overcome by means of the track conveyor configuration of the present invention wherein the trays carried by the conveyor change direction only at the inlets to and outlets from the circular spirals of the track conveyor.

The forced convective track oven 250 comprises 4 zones which are individually controllable in accordance with the baking requirements of the dough products which are transported through the oven 250 at any particular time. Zone 1 comprises the lower tiers of the ascending spiral 256 of the conveyor 252; Zone 2 comprises the upper tiers of the ascending spiral 256 of the conveyor 252; Zone 3 comprises the upper tiers of the descending spiral 258 of the conveyor 252; and Zone 4 comprises the lower tiers of the descending circular spiral portion 258 of the conveyor 252. A burner 270 directs heated air to Zone 2 of the oven 250 through four outlet tubes 272, 274, 276, and 278, each associated with a particular quadrant of the ascending circular spiral 256. A burner 280 directs heated air to Zone 1 of the oven 250 through 4 similar outlet tubes 282,284, 286, and 288 (omitted in FIG. 3 for clarity), each associated with a particular quadrant of the ascending circular spiral 256 of the conveyor 252.

A burner 290 supplies heated air to Zone 3 of the oven 250 through a series of outlet tubes 292, 294, 296, and 298, each associated with one quadrant of the descending circular spiral 250 of the conveyor 252. A burner 300 directs heated air to Zone 4 of the oven 250 through 4 discharge tubes 302, 306, and 308 (omitted in FIG. 3 for clarity),each associated with one quadrant of the descending circular spiral portion 258 of the conveyor 252. Fans 310 and 312 intake previously heated air from the upper regions of the oven enclosure 354 and direct the heated air to the burner 270 for recirculation to Zone 2 of the oven 250. Likewise, fans 314 and 316 intake previously heated air from the upper regions of the oven enclosure 254 and direct the heated air to the burner 280 for recirculation to Zone 1 of the oven 250. Fans 318 and 320 receive previously heated air from the upper regions of the enclosure 254 and direct the heated air to the burner 290 for recirculation to Zone 3 of the oven, and fans 322 (omitted in FIG. 3 for clarity) and 324 receive heated air from the upper portion of the enclosure 254 and direct the heated air to burner 300 for recirculation to Zone 4 of the oven 250.

Referring now to FIG. 2, reference numerals 330, 322, 334, and 336 identify Zones 1, 2, 3, and 4, respectively of the oven 250. Each of the outlet tubes 272–278, 282–288, 292–298, and 302–308 extends to a plenum 338 which is individual to one quadrant of one of the zones comprising the oven 250. Each plenum 338 has a plurality of discharge tubes 340 extending therefrom. The number of discharged tubes extending from a particular plenum depends on the requirements of particular applications of the invention, however, in most instances each plenum 338 will have between about 30 and about 50 discharge tubes 340 extending therefrom.

Referring to FIG. 5, the discharge tubes 340 extend to discharge nozzle assemblies 342. At the location of each discharge assembly 342, a passageway tube 344 extends through the discharge tube 340. A passageway 346 surrounds the tube 344 and comprises an outlet from the discharge tube 340 which causes an upward flow of hot primary air from the discharge tube 340 to the discharge nozzle assembly 342.

The upward flow of hot primary air from the discharge tube 340 creates a venturi which draws cooler used air into the upwardly directed stream of hot primary air from two sources. One source exists below the tube 340 and enters the upwardly flowing stream through the tube 344. The second source comprises cooler used air discharged from upwardly directed nozzles 348 of the discharged nozzle 342. Thus, the nozzles 348 discharge a mixture of hot primary air and cooler used air upwardly toward the bakery trays carried on the tier of the conveyor 352 located next above the particular discharge nozzle assembly 342.

The practice of the present invention incorporates two distinct advantages. First, rather than utilizing ribbon burners to heat dough products primarily by radiation, the present invention uses a plurality of burners and discharge structure extending therefrom to heat the dough products by forced convection. Secondly, the use of a conveyor assembly comprising two cylindrical spirals substantially reduces the likelihood of pan jamming in the operation of the system.

Although preferred embodiments of the invention have been illustrated in the accompanying Drawings and described in the foregoing Detailed Description, it will be understood that the invention is not limited to the embodiments disclosed, but is capable of numerous rearrangements, modifications, and substitutions of parts and elements without departing from the spirit of the invenion.

I claim:

1. In combination with a track oven in which a conveyor transports bakery trays along a predetermined helical course, the improvement comprising:

at least one burner for generating heated air;

a plurality of discharge tubes each operatively connected to the burner for receiving heated air therefrom and each for generating a flow of hot primary air, and a plurality of discharge nozzle assemblies for receiving hot primary air from the discharge tube, for mixing the hot primary air with cooler used air, and for directing the air mixture into engagement with bakery trays conveyed along the predetermined course by the conveyor of the track oven.

* * * * *

UNITED STATES PATENT AND TRADEMARK OFFICE
CERTIFICATE OF CORRECTION

PATENT NO. : 6,065,463
DATED : May 23, 2000
INVENTOR(S) : Martin

It is certified that error appears in the above-identified patent and that said Letters Patent is hereby corrected as shown below:

In the Abstract, line 4, replace "spiral spiral" with --spiral--.
Col. 1, line 40, replace "ribbonn" with --ribbon--.
Col. 2, line 3, replace "that allows" with --allows--.
Col. 2, lines 20-21, delete the phrase "discharge apparatus of the."
Col. 2, line 27, delete "{???Stuart???]."
Col. 2, line 34, replace "portion of" with --portions of--.
Col. 2, line 39, replace "convective oven" with --convective track oven--.
Col. 3, line 16, replace "ascending spiral" with --ascending circular spiral--.
Col. 3, line 18, replace "ascending spiral" with --ascending circular spiral--.
Col. 3, line 19, replace "descending spiral" with --descending circular spiral--.
Col. 3, line 33, replace "spiral 250" with --spiral 258--.
Col. 3, line 34, replace "tubes 302" with --tubes 302, 304--.
Col. 3, line 35, replace "clarity),each" with --clarity), each--.
Col. 3, line 51, replace "330, 322" with --330, 332--.
Col. 4, line 21, replace "nozzle 342" with --nozzle assembly 342--.
Col. 4, line 29, replace "discharge structure" with --discharge structures--.
Col. 4, line 40, replace "invenion" with --invention--.

Signed and Sealed this

Twenty-fourth Day of April, 2001

Attest:

NICHOLAS P. GODICI

*Attesting Officer*   *Acting Director of the United States Patent and Trademark Office*